May 23, 1950 J. T. ROBERTS 2,508,838
SOLAR AZIMUTH PROTRACTOR
Filed May 7, 1946
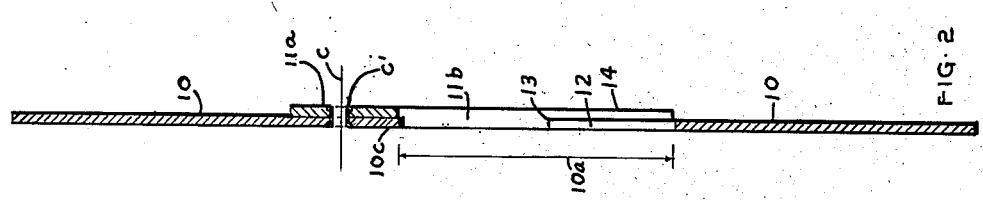
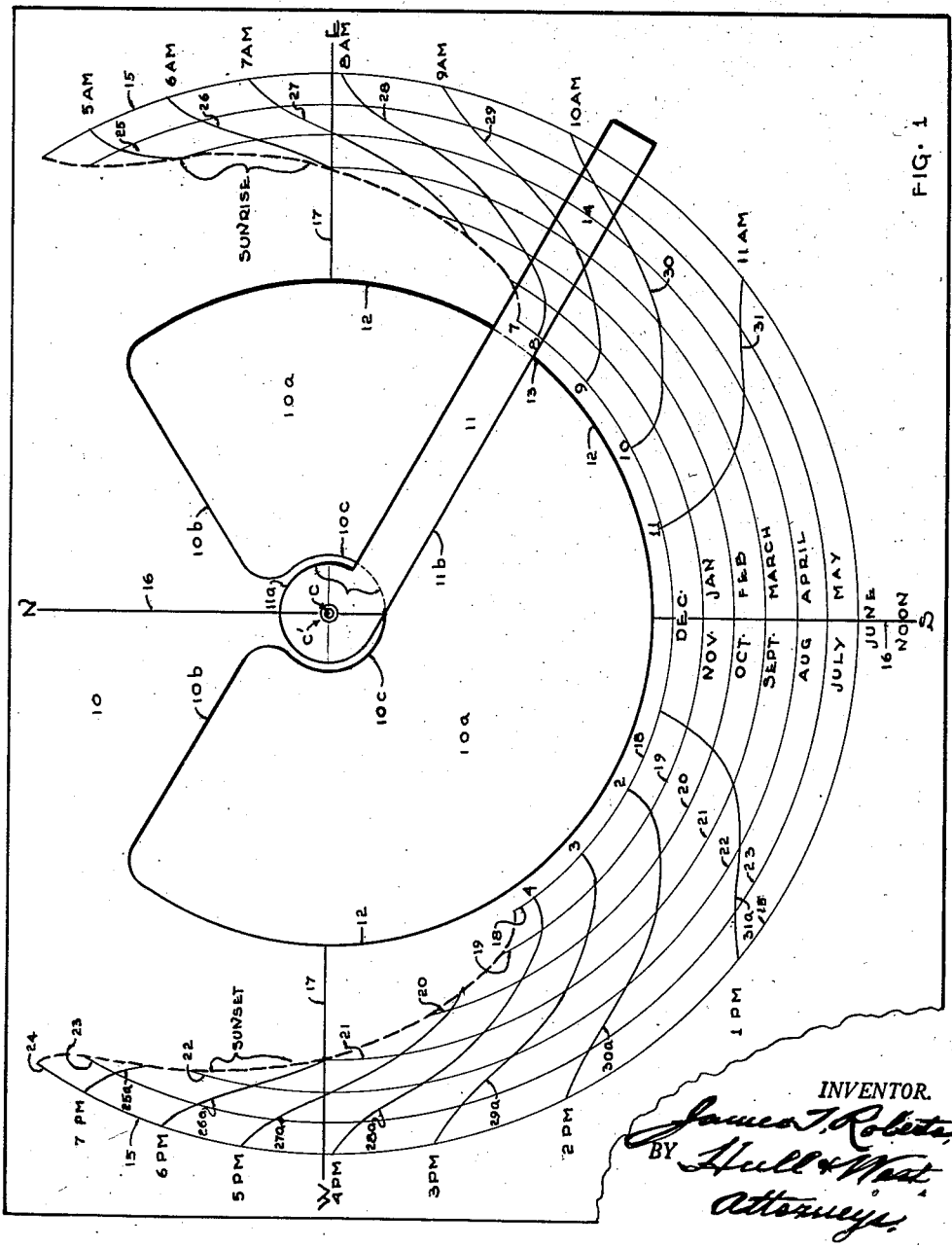
INVENTOR.
James T. Roberts
BY Hull & West
Attorneys Patented May 23, 1950

2,508,838

UNITED STATES PATENT OFFICE 2,508,838

SOLAR AZIMUTH PROTRACTOR

James T. Roberts, Cleveland, Ohio

Application May 7, 1946, Serial No. 667,907

4 Claims. (Cl. 33—1)

This invention relates to an instrument which enables the users of the same to ascertain promply the direction of the sun with reference to a meridian or north-and-south line for any hour of any day of any month of a year within a particular zone and also to ascertain the duration of maximum possible sunlight for any day of any month of a year. While an instrument of this type is capable of more general application, it is particularly useful in enabling architects to secure the proper orientation of buildings with respect to the direction and duration of sunlight; with respect to "sky shine" without direct sunlight; and with respect to sunlight as affected by the location of light-obstructing buildings or objects; to plan the location, size and inclination of windows or other openings in regard to sunlight, and its accompanying heat, or in regard to "sky shine"; to plan the insulation of buildings in regard to the duration of solar light and heat and to plan the heating systems of buildings in such manner as to balance the effect known to accompany solar radiation; to plan the arrangement of projections such as canopies; to ascertain what accommodations must be made for the desired number and size of windows, canopies and louvers; to arrange the spacing of buildings in accordance with health standards based upon hours of unobstructed sunshine; and to determine the infringement of sunlight of a proposed building in relation to various parts of an existing building.

I secure the foregoing results by the instrument shown in the drawing hereof and which I have designated a solar protractor and wherein Fig. 1 represents a plan view of the instrument; and Fig. 2 a vertical central sectional view taken therethrough.

10 denotes generally a base member the plane of the front of which corresponds to the plane of the horizon and which has an arcuate open central portion 10a the top of which is defined by opopsite downwardly extending edge walls 10b of the upper portion of said base member and by a projection 10c extending downwardly from the said walls and located centrally of the circle of which the arc defining the exterior of the open central portion 10a forms a part. An index member 11 is pivotally mounted on the projection 10c at the center C of the circle of which the aforesaid arc forms a part. This member has parallel side edges, the plane of the upper side edge of which constitutees a straight edge which passes through the center C, and it is provided with a central circular portion 11a which is of less thickness than the thickness of the body of the said member and by which it is pivoted upon said projection at the center C as by means of a bushing C', the joint thickness of this circular portion 11a and the thickness of the projection 10c being preferably equal to the thickness of the body of said index member. The thicker portion 11b of the index member extends from the portion 11a to the arcuate wall 12 of the open central portion 10a and is there reduced in thickness to provide an arcuate shoulder 13 for engagement with the wall 12, the outer end 14 of the index members being correspondingly reduced in thickness where they extend over and in contact with the portion of the base member with which this end cooperates.

15 denotes an arc which is struck from the center C and between which and the arc 12 other arcs are drawn from the center C and all of which arcs are provided with indicia whereby the knowledge sought to be obtained by my instrument may be readily obtained.

It should be noted here that the arcs are assumed to be arcs of the horizon of the particular zone of latitude embraced by and within the purview of the instrument. The zenith will be assumed to be vertically above the center C and the line 16 represents a meridian or north-and-south line the plane of which passes through the zenith and the center C. The ends of the line are denoted by the letters N and S, respectively, and, as the instrument shown herein is designed for use in north latitudes, the "south" end of the line also indicates the "noon" position of the sun. 17 denotes an east-and-west line which also passes through the center C.

18, 19, 20, 21, 22, and 23 denote arcs struck from the center C between the arcs 12 and 15 and preferably spaced equidistantly apart. The innermost of these arcs is allotted to the month having the shortest possible duration of sunlight, the said month being December in north latitudes; hence this name is applied to the said arc on the drawing. The next arc is allotted to the pair of months having the next shortest possible duration of sunlight, the said months being November and January in north latitudes, and their names are applied to the said arc on the drawing. The next arcs are successively allotted to October and February, September and March, August and April, July and May, and the outermost is allotted to the month of June, and these names are applied to the appropriate arcs on the drawing, the names appearing in proximity to the meridian line. Each arc has noted thereon the visible position of the sun at different hours of the day, both before and after noon, these position being determined by the points of intersection of vertical circles with the horizon at the said hours as well as at sunrise and sunset and being ascertainable from available information supplied for all of the months of the year and for all of the days and hours of each of said months and for the times of sunrise and sunset for all of said days. Thus, on the innermost arc the position of the sun at sunrise is indicated on the right-hand side of said arc by the appropriate word and its hour positions thereafter in the morning by the numerals 8, 9, 10 and 11. The corresponding positions of the sun in the afternoon are indicated by the numerals 1, 2, 3, and 4 on the left-hand side of said arc, and its position at sunset is indicated by the appropriate word at the left-hand end of the arc.

As December is the month of minimum duration of sunlight in northern latitudes and as June is the month of maximum duration of sunlight in such latitudes, I have grouped the intermediate months in pairs according to their distance in time from these two extremes. The arc 19 is allotted to the months of November and January, since they are each one month distant from December. The arc 20 is allotted to the months of October and February, since they are each two months removed from December, and so on, through the arcs 21, 22 and 23, up to and including the months of July and May which are each five months removed from December and only one month removed from June, to which the outermost arc 24 is allotted. Each of the arcs 18, 19, 20, 21, 22, 23 and 24 is shown as only of such functional angular extent as will include the times of sunrise and sunset, the ends of these arcs being connected by broken lines bearing the appropriate "sunrise" and "sunset" designations.

On the outermost arc, it will be noted that the hour of sunrise is approximately 4:30 a. m. and that the hour of sunset is approximately 7:30 p. m., these hours being the average hours of sunrise and sunset for the month of June in a zone of 33°–30° north latitude. It will also be noted that lines 25—31 and 25ᵃ—31ᵃ are drawn from the hourly designations on opposite sides of the arc 24 only across the inner arcs wherein the sunrise occurs at least as early and the sun sets at least as late as the hours from which the said lines extend. Thus, the lines 25 and 25ᵃ intersect only the arcs 24 and 23, since the months of June, July and May are the only months wherein the sun may rise as early as 5:00 a. m. and set as late as 7:00 p. m. In like manner, the lines 26 and 26ᵃ, which extend from the hourly designations 6 on opposite sides of the arc 24, intersect only the arcs 24, 23, 22 and 21, the months of March and September being the only ones, additional to the months of June, July and May, and August and April, wherein the sun rises as early as 6:00 a. m. and sets as late as 6:00 p. m. In like manner, the lines 27 and 27ᵃ intersect the arc 20, but not the arcs 19 and 18, and the lines 28 and 28ᵃ to 30 and 30A intersect all the arcs. All of the arcs intersect the line representing "noon."

For convenience of reference and to avoid the necessity for repetition of the application of the hour designations to the different arcs, only the innermost arc and the outermost arc are provided with such designations, and the intersections, with the intermediate arcs, of the curved lines which extend between like hour numerals on the innermost and the outermost arcs determine the positions of the said hours on the respective intermediate arcs.

By reference to this instrument, the operator is enabled, not only to ascertain, at a glance, the average position of the sun for any hour of any day of any month of the year within the zone plotted, but also to ascertain its angular distance with respect to the meridian or the east-and-west line. He is also enabled to ascertain the average duration of possible sunlight for any day of the year within the zone plotted as well as to plan intelligently concerning the location or orientation of a building, the location and size of windows thereof and to plan means for compensating for what would otherwise be excessive or insufficient sunlight.

By placing the instrument upon a drawing, or reproduction, of a plan showing the various elements to be considered, and where the direction of true north is known, one can use the index and the instrument as a protractor for making upon said sheets a graphic representation of the variations in total possible maximum sunlight in different months of the year as well as in any group of such months.

The drawing clearly shows that the arcs 15 and 18 through 23 extend equidistantly in opposite directions from the meridian line 16.

Having thus described my invention, what I claim is:

1. An instrument of the character specified comprising a base member having an operating surface corresponding to and representing the plane of the horizon and having a meridian line thereon, the said line providing a center, intermediate of the ends thereof, for a series of seven concentric arcs struck therefrom and increasing in functional length progressively from the innermost to the outermost arc, and each of said arcs extending functionally equidistantly in opposite directions from the meridian line, the month having the shortest duration of possible sunlight being allotted to the innermost of said arcs and the month having the longest possible duration of sunlight being allotted to the outermost of said arcs, the intermediate arcs being allotted each to a pair of months, the months having the same possible duration of sunlight being paired and the pair of months having the shortest duration of possible sunlight after the month allotted to the innermost arc being allotted to the arc next adjacent to said innermost arc, and the pairs of months for the remaining intermediate arcs being allotted progressively thereon from the innermost of said intermediate arcs to the outermost arc in accordance with the increase in possible duration of sunlight in each of said intermediate arcs as compared with the possible duration of sunlight in the next preceding arc, the position of the sun at sunrise and at each hour of the morning from sunrise until noon being plotted on that side of each arc which extends eastwardly from the said meridian line and the position of the sun at sunset and at each hour of the afternoon from noon until sunset being plotted on that side of each arc which extends westwardly from the said meridian line, the positions of the sun as plotted upon the said arcs representing the mean of such positions for the zone within which the said instrument is to be employed, and an index member mounted for rotation about said center, the said index member having a straight edge, a continuation of which intersects the said center, and which straight edge extends across the said arcs.

2. An instrument of the character specified comprising a base member having an operating surface corresponding to and representing the plane of the horizon and having a meridian line thereon, the said line providing a center, intermediate of the ends thereof, for a series of seven concentric arcs struck therefrom and increasing in functional length progressively from the innermost to the outermost arc, and each of said arcs extending functionally equidistantly in opposite directions from the meridian line, the month having the shortest duration of possible sunlight being allotted to the innermost of said arcs and the month having the longest possible duration of sunlight being allotted to the outermost of said arcs, the intermediate arcs being allotted each to a pair of months, the months having the same possible duration of sunlight being paired and the pair of months having the shortest duration of possible sunlight after the month allotted to the innermost arc being allotted to the arc next adjacent to said innermost arc, and the pairs of months for the remaining intermediate arcs being allotted progressively thereon from the innermost of said intermediate arcs to the outermost arc in accordance with the increase in possible duration of sunlight in each of said intermediate arcs as compared with the possible duration of sunlight in the next preceding arc, the position of the sun at sunrise and at each hour of the morning from sunrise until noon being plotted on that side of each arc which extends eastwardly from the said meridian line and the position of the sun at sunset and at each hour of the afternoon from noon until sunset being plotted on that side of each arc which extends westwardly from the said meridian line, the positions of the sun as plotted upon the said arcs representing the mean of such positions for the zone within which the said instrument is to be employed, the base being provided with a segmental opening and having a projection extending into said opening, said projection including said center and said base having walls defining said opening end extending upwardly and outwardly from the said projection and merging at their ends with an arcuate wall beyond which the various arcs are located, an index having an end portion pivotally mounted upon the said projection of the base for rotation about the said center and having a straight edge the plane of which intersects the said center, the said index member being provided on its lower side with an arcuate shoulder adapted to engage the said arcuate wall and being also provided with an extension beyond said shoulder overlapping all of the aforesaid arcs whereby the straight edge is enabled to be brought into register with any of the hour sunrise and sunset designations with which the said arcs are provided 3. An instrument of the character specified comprising a base member having an operating surface corresponding to and representing the plane of the horizon and having a meridian line thereon, the said line providing a center intermediate its ends for a series of concentric arcs struck therefrom and increasing in functional length progressively from the innermost to the outermost arc, with each of said arcs extending functionally equidistantly in opposite directions from the meridian line, said base member also having an east-west line formed thereon extending through said center, said base member also having curved lines connecting corresponding portions of said arcs wherein such portions of said arcs represent the daylight hours of a day in different months of the year, the base being provided with an arcuate segmental opening and having a projection extending into said opening, said projection including said center and said base having walls defining said opening and extending upwardly and outwardly from the said projection and merging at their ends with an arcuate wall beyond which the various arcs are located, an index having an end portion pivotally mounted upon the said projection of the base for rotation about the said center and having a straight edge a continuation of which intersects the said center, the said index member being provided on its lower side with an arcuate shoulder adapted to engage the said arcuate wall and being also provided with an extension beyond said shoulder overlapping all of the aforesaid arcs whereby the straight edge is enabled to be brought into register with any of the hour designations between sunrise and sunset with which the said arcs are provided.

4. An instrument of the character specified comprising a base member having an operating surface corresponding to and representing the plane of the horizon and having a meridian line thereon, the said line providing a center intermediate its ends for a series of concentric arcs struck therefrom, said base member also having curved lines connecting corresponding portions of said arcs, the base being provided with a segmental opening and having a projection extending into said opening, said projection including said center and said base having walls defining said opening and extending upwardly and outwardly from the said projection and merging at their ends with an arcuate wall beyond which the various arcs are located, an index having an end portion pivotally mounted upon the said projection of the base for rotation about the said center and having a straight edge a continuation of which intersects the said center, the said index member being of such length as to overlap all of the aforesaid arcs whereby the straight edge is enabled to be brought into register with any of the said arcs.

JAMES T. ROBERTS.

REFERENCES CITED

The following references are of record in the file of this patent:

UNITED STATES PATENTS

| Number | Name | Date |
| --- | --- | --- |
| 89,585 | Johnson | May 4, 1869 |
| 853,338 | Bissell | May 14, 1907 |
| 977,048 | Smith | Nov. 29, 1910 |
| 1,742,781 | Ott | Jan. 7, 1930 |

FOREIGN PATENTS

| Number | Country | Date |
| --- | --- | --- |
| 1,564 | Great Britain | A. D. 1910 |
| 264,274 | Great Britain | Jan. 20, 1927 |